United States Patent [19]
Csapo et al.

[11] Patent Number: 5,701,297
[45] Date of Patent: Dec. 23, 1997

[54] DATA OVER CELLULAR

[75] Inventors: John Steven Csapo, Glenview; James Peter Aldrich, Glendale Heights; Ben Douglas Gay, Inverness, all of Ill.

[73] Assignee: Motorola, Inc., Schaumburg, Ill.

[21] Appl. No.: 281,873

[22] Filed: Jul. 28, 1994

Related U.S. Application Data

[63] Continuation of Ser. No. 958,588, Oct. 8, 1992, abandoned, which is a continuation-in-part of Ser. No. 413,157, Sep. 27, 1989, abandoned.

[51] Int. Cl.[6] .................................................. H04J 3/16
[52] U.S. Cl. .......................... 370/341; 370/331; 455/33.2
[58] Field of Search .......................... 370/95.1, 95.3, 370/110.1, 60, 94.1, 85.7, 79, 105.2, 105.4, 321, 328, 340, 341, 349, 311, 347, 346, 319, 323, 326, 329, 331, 336; 455/33.1, 34.1, 34.2, 53.1, 54.1, 15, 17, 33.2, 37.1; 379/58, 59, 60, 63

[56] References Cited

U.S. PATENT DOCUMENTS

| | | | |
|---|---|---|---|
| 4,019,176 | 4/1977 | Cour et al. | 370/95.1 |
| 4,354,252 | 10/1982 | Lamb et al. | 364/900 |
| 4,517,669 | 5/1985 | Freeburg et al. | 370/82 |
| 4,519,068 | 5/1985 | Krebs et al. | 370/80 |
| 4,654,867 | 3/1987 | Labedz | 379/59 |
| 4,670,906 | 6/1987 | Thro | 455/56 |
| 4,747,101 | 5/1988 | Akaiwa et al. | 370/95.1 |
| 4,785,450 | 11/1988 | Bolgiano et al. | 370/95.1 |
| 4,803,726 | 2/1989 | Levine et al. | 380/48 |
| 4,837,858 | 6/1989 | Ablay et al. | 455/34.1 |
| 4,866,710 | 9/1989 | Schaeffer | 370/95.1 |
| 4,866,788 | 9/1989 | Mouly et al. | 455/33 |
| 4,881,271 | 11/1989 | Yamauchi et al. | 379/59 |
| 4,893,321 | 1/1990 | Stern et al. | 379/59 |
| 5,199,031 | 3/1993 | Dahlin | 370/110.1 |
| 5,235,598 | 8/1993 | Sasuta | 370/110.1 |
| 5,297,192 | 3/1994 | Gerszberg | 379/59 |

*Primary Examiner*—Dang Ton
*Attorney, Agent, or Firm*—Richard A. Sonnentag

[57] ABSTRACT

There is provided a mechanism for providing data services over a wireless cellular network. It comprises: establishing communications over the cellular network; upon a subscriber designating that it has a data communication, redirecting data traffic to the designated frequency (a shared data channel) on an interconnected wireless data network exhibiting (cellular) reuse of data channel frequencies; and returning the subscriber's transceiver to voice mode upon cessation of data communications. Data service will appear to have been provided by the cellular network.

8 Claims, 4 Drawing Sheets

DATA OVER CELLULAR

This is a continuation of application Ser. No. 07/958,588, filed Oct. 8, 1992, and now abandoned, which is a continuation-in-part of application Ser. No. 07/413,157, filed on Sep. 27, 1989 and now abandoned.

THE FIELD OF INVENTION

This invention is concerned with providing data services over a wireless cellular network.

More particularly, this invention is concerned with mechanisms for the transmission of data over cellular networks via an interconnected wireless data network.

BACKGROUND OF THE INVENTION

Traditionally, wireless cellular radio-telephone systems were designed to carry analog voice traffic. The Voice Channel Protocol consists of control signalling (handoff instructions, power level information, etc.) which was imbedded in the voice traffic in a way that made it nearly imperceptible to the conversants. However, data transmission is intolerant to such interruption. Accordingly, the transmission of data over cellular networks has required the development of data protocols to avoid these interruptions.

U.S. Pat. No. 4,654,867 to Labedz et al., assigned to Motorola, transmits data over voice channels by halting the data transmissions (particularly during handoff when it is changing from one channel to another), performing the control (or supervisory) signalling, and resuming the data transmission. But, since the data transmission takes place on the voice channel (or a channel for combined voice and data), the efficiency of the channel is not as high as it might be.

This invention takes as its object to overcome these shortcomings and to realize certain advantages presented below.

SUMMARY OF THE INVENTION

This invention improves channel efficiency by redirecting data traffic to an interconnected wireless data network having shared channels dedicated to data traffic. Since the data traffic is packet-switched on a shared channel, channel efficiency and spectrum utilization substantially increase.

There is provided a mechanism for providing data services over a wireless cellular network. It comprises: establishing communications over the cellular network; upon a subscriber designating that it has a data communication, redirecting data traffic to the designated frequency (a shared data channel) on an interconnected wireless data network exhibiting (cellular) reuse of data channel frequencies; and returning the subscriber's transceiver to voice mode upon cessation of data communications. Data service will appear to have been provided by the cellular network.

DESCRIPTION OF THE DRAWINGS

Additional objects, features and advantages of the invention will be more clearly understood and the best mode contemplated for practicing it in its preferred embodiment will be appreciated (by way of unrestricted example) from the following detailed description, taken together with the accompanying drawings in which.

DETAILED DESCRIPTION

Figure 1:
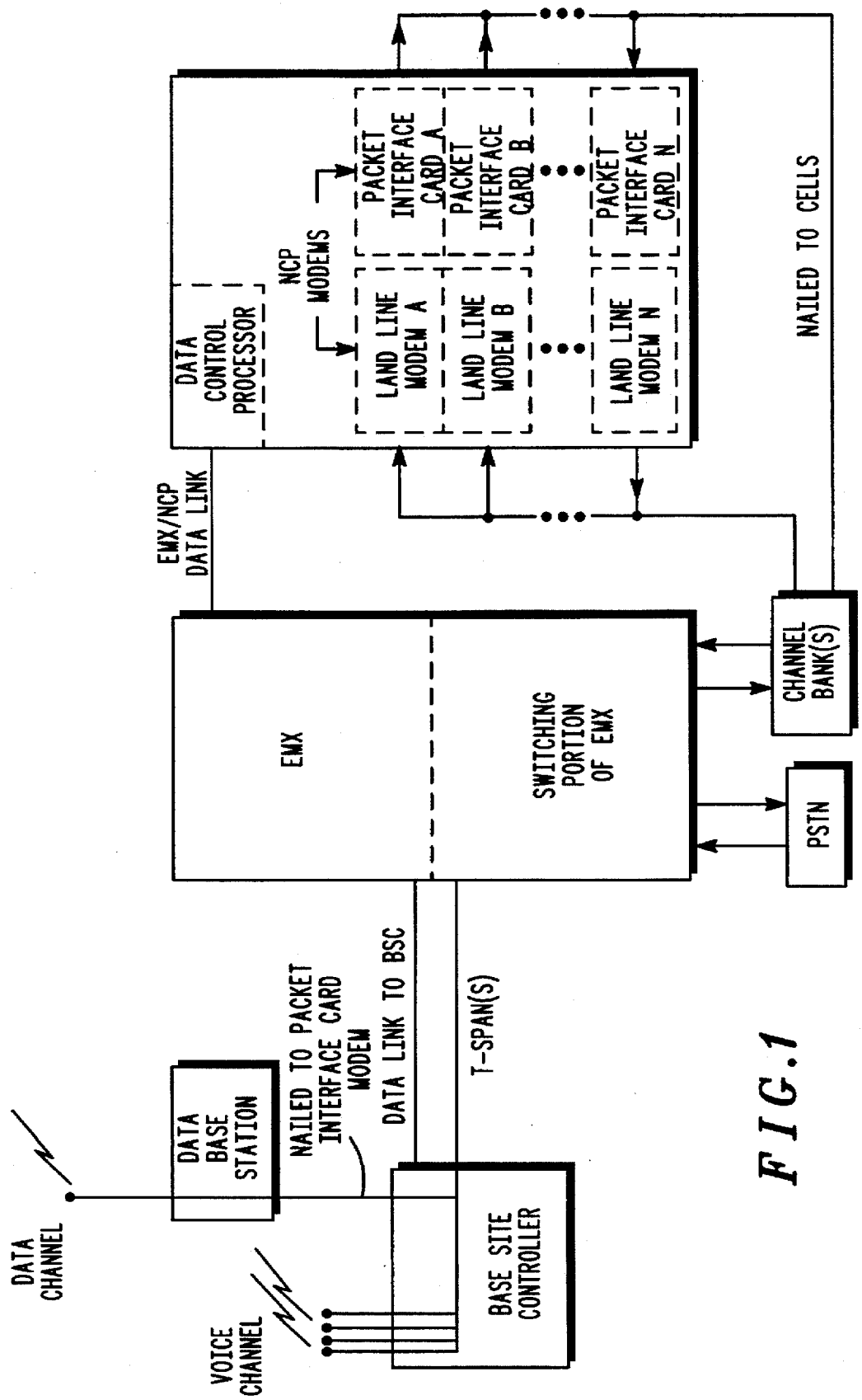
FIG. 1 is a block diagram of the interconnected wireless cellular and data networks according to the preferred embodiment of the invention.

FIG. 1 is a block diagram of the interconnected wireless cellular and data networks according to the preferred embodiment of the invention. The cellular network consists of: Base Site Controllers (BSCs) in each cell and its associated Base Stations (BSs, represented by a plurality of antennas) for each voice channel in the cell, coupled along with those in other cells by time-division-multiplexed T1 span lines to its Electronic Mobile eXchange (EMX), which is, in turn, coupled to the Public Switched Telephone Network (PSTN) for land-line telephone calls. Thus, land-line voice telephone calls with the PSTN are switched by the EMX to the various BSCs and BSs as a subscriber moves from cell to cell; similarly, mobile subscriber-to-mobile subscriber calls are switched by the EMX from the various originating BSs and BSCs to the various recipient BSCs and BSs as both subscribers move about.

The wireless data network (see U.S. Pat. No. 4,670,906 to Thro, assigned to Motorola and corresponding to Motorola's KDT product family) consists of: a system-wide, single frequency geographically reused, shared data channel transceived by Data Base Stations (DBSs). DBSs are coupled (through that cell's BSC and switched by the EMX) to the Network Control Processor (NCP) of the data network. If no data traffic exists, the Data Base Station (DBS) is available for voice traffic, but ceases to be a voice channel and becomes a shared data channel upon the first data request.

In operation, data modulated by a modem is received from a land-line call off the PSTN and is switched by the EMX and multiplexed over a span line to Channel Banks (CBs) that demultiplex the modulated data and supply it to the Land-Line Modem (LLM) of the data Network Control Processor (NCP). The data demodulated by the land-line modem is packetized by the Packet Interface Card (PIC) and remultiplexed by the CBs back onto the span lines to the EMX. The EMX then switches those packets to the intended mobile recipient across T1 span lines (through its associated BSC) to the Data Base Station (DBS) where the target subscriber is at the moment. The DBS transmits the packet to the mobile subscriber, who disassembles the packet, extracts the data, shifts the voltage levels to RS-232 levels and provides that data to Data Terminal Equipment (DTE) such as a portable PC or facsimile machine. Subscriber-originated data transmission follow the same path, in reverse; mobile-to-mobile data calls are switched by the EMX among BSCs rather than with the PSTN.

Figure 2:
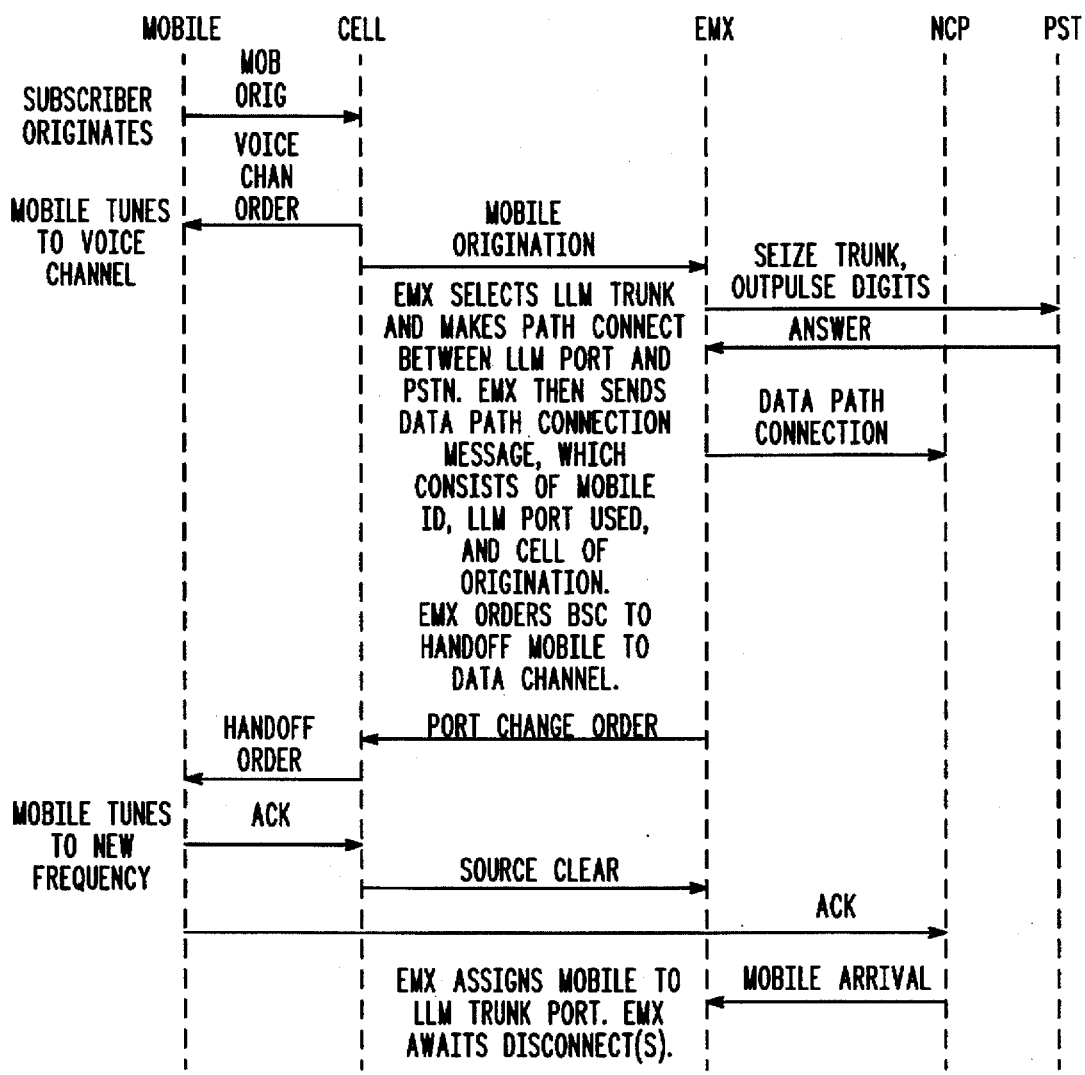
FIGS. 2, 3 and 4 are event diagrams of the control protocol in accordance with the preferred embodiment of the invention.
Figure 3:
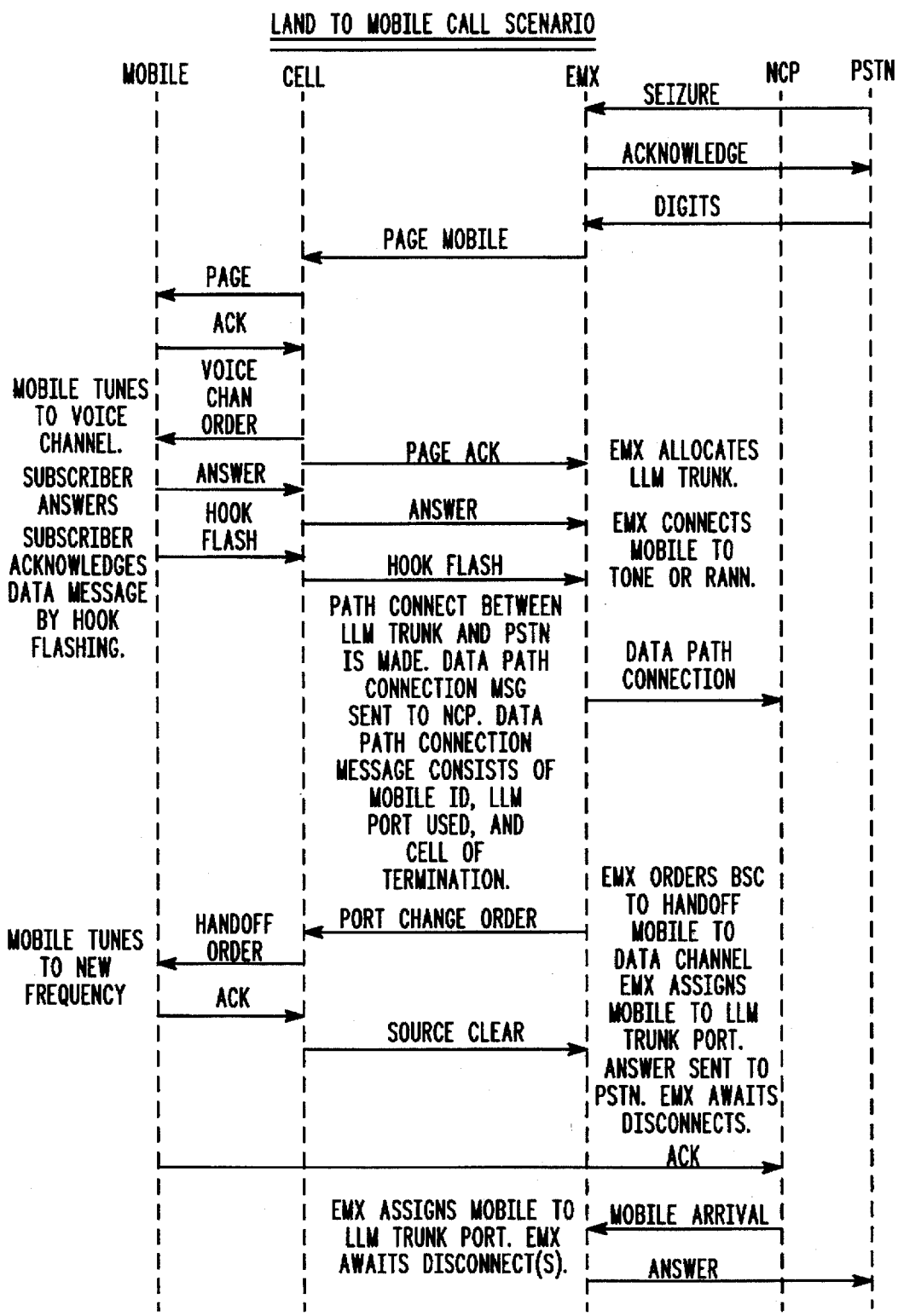
Figure 4:
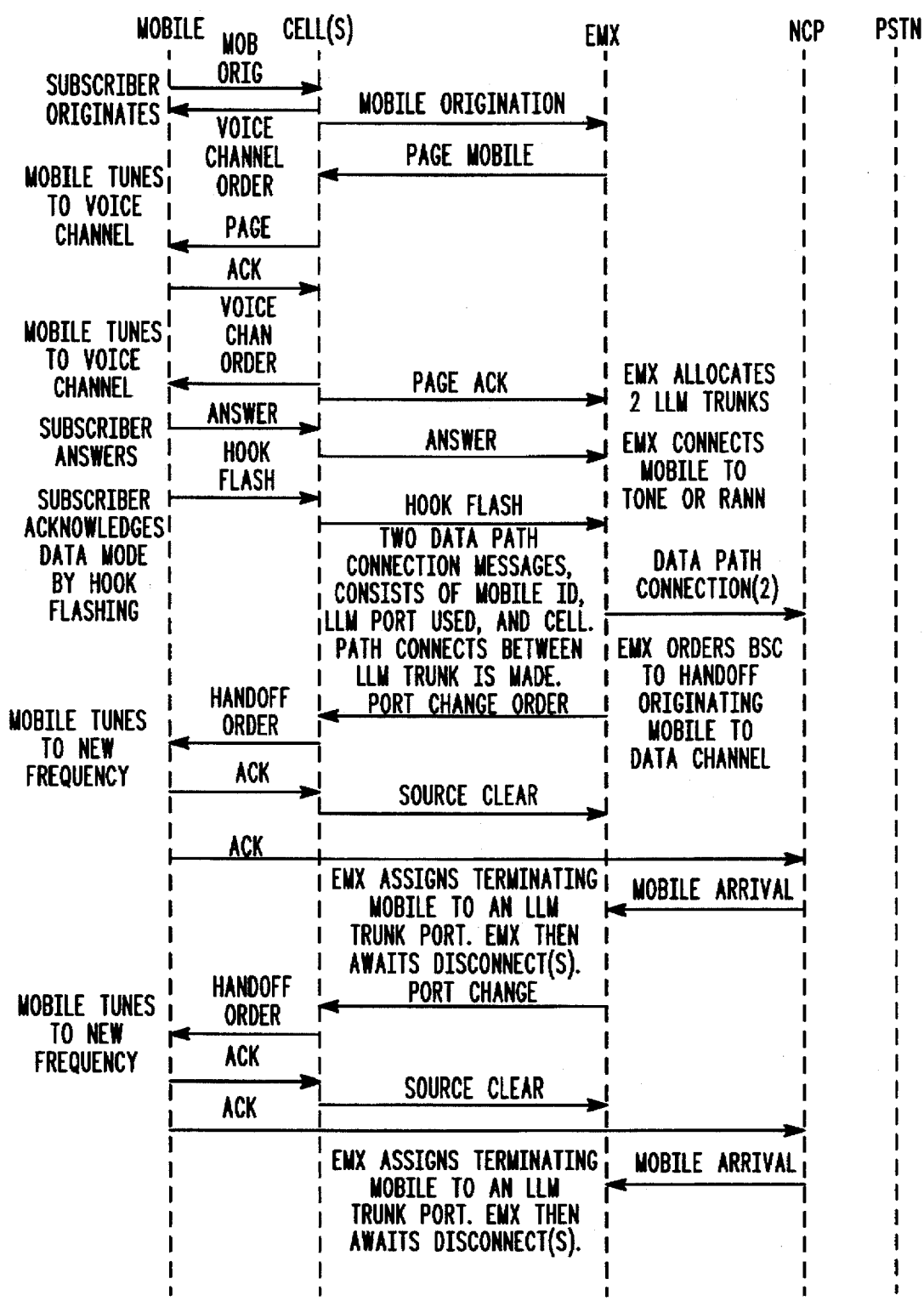

FIGS. 2, 3 and 4 are event diagrams of the control protocol in accordance with the preferred embodiment of the invention. In each instance, a voice-type call is set up on the wireless cellular network and then redirected to the wireless data network. FIGS. 2, 3 and 4 illustrate the call set up and redirection.

FIG. 2 illustrates the events (from top to bottom) that occur between the Subscriber, Cell Site, Mobile Exchange, Network Control Processor and PSTN during a Subscriber-to-Land data call; the arrows indicate the direction of the communication. A cellular mobile subscriber originates a call (by keying and sending the desired land-line telephone number) and receives a voice channel allocation. The EMX seizes a trunk line and outpulses the digits keyed by the subscriber. The called number (perhaps a modem or facsimile machine) answers and the BSC hands the call off from the voice channel to the data channel; the subscriber retunes to the data frequency and commences data transmission while the EMX awaits completion of the data call on the wireless data network. Handoff from DBS to DBS is managed by the NCP (according to Thro) and upon completion of the data transmission, the mobile subscriber reverts to voice mode to ready itself to be paged again by the wireless cellular network.

FIG. 3 illustrates the events (from top to bottom) that occur between the Subscriber, Cell Site, Mobile Exchange, Network Control Processor and PSTN during a Land-to-Subscriber data call; the arrows indicate the direction of the communication. In a land-originated call, the PSTN seizes an EMX trunk line and passes the dialed digits to the EMX, which locates and pages the intended mobile subscriber via the wireless cellular network. The mobile subscriber acknowledges the page and is given a voice channel allocation. The mobile subscriber is given an indication of and acknowledges that it is about to receive a data message and is handed off to the data channel. The subscriber retunes to the data frequency and the land-line commences data transmission while the EMX awaits completion of the data call on the wireless data network.

FIG. 4 illustrates the events (from top to bottom) that occur between the Subscriber, Cell Site, Mobile Exchange, Network Control Processor and PSTN during a Subscriber-to-Subscriber data call; the arrows indicate the direction of the communication. This scenario differs from the mobile subscriber initiated call in that one subscriber is paged by the other and then both are handed off and retune to the data frequency.

Thus, there has been provided a mechanism for providing data services over a wireless cellular network. It comprises: establishing communications over the cellular network; upon a subscriber designating that it has a data communication, redirecting data traffic to the designated frequency (a shared data channel) on an interconnected wireless data network exhibiting (cellular) reuse of data channel frequencies; and returning the subscriber's transceiver to voice mode upon cessation of data communications. Data service will appear to have been provided by the cellular network.

The attendant advantages of this invention include higher spectral efficiency in that a voice channel is not tied up during casual data exchanges, but is concentrated on a dedicated, shared, packet-switched data network.

While the preferred embodiment of the invention has been described and shown, it will be appreciated by those skilled in this field that other variations and modifications of this invention may be implemented. For example, a subscriber unit need not be voice capable; a data-only subscriber could have his call set up over the cellular network and then redirected to the data network. All such variations and adaptations are expected to fall within the ambit of the appended claims.

What we claim and desire to secure by Letters Patent is:

1. A method of providing data services in a cellular network comprising:

establishing a call between a subscriber unit and a base station over a voice cellular network using a voice transmission protocol;

handing off the call from the voice cellular network to an interconnected wireless data network for transmission of user data traffic upon receiving a data designation from one of the subscriber and the base station;

sending and receiving user data traffic between the subscriber and the interconnected wireless data network; and handing off the call back to the voice cellular network upon the completion of the sending and receiving of user data traffic by the wireless data network.

2. The method as claimed in claim 1 above, wherein the step of establishing a call further comprises the step of allocating a voice traffic channel to the subscriber.

3. The method as claimed in claim 1 above, wherein the interconnected wireless data network exhibits a cellular reuse of a plurality of data channel frequencies.

4. The method as claimed in claim 1 above, wherein the interconnected wireless data network has a shared data channel.

5. The method as claimed in claim 4 above, wherein data transmissions on the shared data channel is a packet switched data transmission.

6. The method as claimed in claim 1 above, wherein the subscriber is billed for a data service based upon an elapsed time for a duration of the subscriber's use of the wireless data network.

7. A cellular network comprising:

means for establishing a call between a subscriber unit and a base station over a cellular network using a voice transmission protocol;

means for handing off the call from the cellular network to the wireless data network upon receiving a data designation from a data originator; and means for transmitting user data over the wireless data network; and means for handing off the call back to the voice cellular network upon the completion of the transmitting of user data over the wireless data network.

8. The cellular network of claim 7, where the wireless data network is available for voice transmission when no data traffic is present.

* * * * *